United States Patent
McDowell, III (10) Patent No.: US 11,691,796 B2
(45) Date of Patent: Jul. 4, 2023

(54) ADJUSTABLE TIGHTENING APPARATUS

(71) Applicant: KML Holding Group LLC, Quakertown, PA (US)

(72) Inventor: George R. McDowell, III, Hellertown, PA (US)

( * ) Notice: Subject to any disclaimer, the term of this patent is extended or adjusted under 35 U.S.C. 154(b) by 0 days.

(21) Appl. No.: 17/677,720

(22) Filed: Feb. 22, 2022

(65) Prior Publication Data

US 2022/0177207 A1 Jun. 9, 2022

Related U.S. Application Data (63) Continuation-in-part of application No. 17/182,189, filed on Feb. 22, 2021, which is a continuation-in-part of application No. 16/202,508, filed on Nov. 28, 2018, now Pat. No. 10,926,929.

(60) Provisional application No. 62/593,908, filed on Dec. 2, 2017.

(51) Int. Cl.
*B65D 63/10* (2006.01)

(52) U.S. Cl.
CPC .... *B65D 63/1063* (2013.01); *B65D 2563/107* (2013.01); *B65D 2563/108* (2013.01)

(58) Field of Classification Search
CPC .......... B65D 63/1063; B65D 2563/107; B65D 2563/108; B65D 63/1072; H02G 3/32; F16L 3/2336
See application file for complete search history.

(56) References Cited

U.S. PATENT DOCUMENTS

| | | | |
|---|---|---|---|
| 3,747,164 A | 7/1973 | Fortsch | |
| 3,908,233 A | 9/1975 | Caveny | |
| 3,991,444 A | 11/1976 | Bailey | |
| 4,236,280 A | 12/1980 | Kreiseder | |
| 4,287,644 A | 9/1981 | Durand | |
| 4,805,856 A | 2/1989 | Nicoli | |
| 4,813,105 A | 3/1989 | Espinosa | |

(Continued)

FOREIGN PATENT DOCUMENTS

| | | |
|---|---|---|
| CN | 204197468 U | 3/2015 |
| DE | WO/1990/011945 A1 | 10/1990 |

(Continued)

OTHER PUBLICATIONS

PCT International Search Report, International Application No. PCT/US2018/062873, dated Feb. 15, 2019 (2 pages).

(Continued)

*Primary Examiner* — David M Upchurch (74) *Attorney, Agent, or Firm* — Douglas J. Ryder; Ryder, Mazzeo & Konieczny LLC (57) ABSTRACT

A tie to secure items therewithin that can be loosened or released to allow the items to be removed therefrom and the tie to be reused. The tie includes an elongated strap having teeth formed thereon that engage with teeth in a locking head to allow movement in only one direction (tightening). A release pad in conjunction with a backplate enables the teeth in the locking head to be disengaged from the teeth on the elongated strap when the release pad is depressed so that the strap can move in an opposite direction (removal). The release pad and the backplate are configured to face away from the items secured within the strap to provide more room for engagement (e.g., by a user's hand) and provide necessary leverage to release the cable tie without need to press the tie against other items (e.g., cables, chassis).

20 Claims, 13 Drawing Sheets

(56) References Cited

U.S. PATENT DOCUMENTS

| | | |
|---|---|---|
| 5,193,250 A | 3/1993 | Caveny |
| 5,577,698 A | 11/1996 | Liu |
| 5,697,455 A | 11/1997 | Alexander |
| 5,758,390 A | 6/1998 | Villeneueve |
| 5,890,265 A | 4/1999 | Christian |
| 5,901,416 A | 5/1999 | Mears |
| 6,185,791 B1 | 2/2001 | Khokhar |
| 7,866,005 B2 | 1/2011 | Vermeer |
| 8,499,419 B2 | 8/2013 | Cheng |
| 8,955,198 B2 | 2/2015 | Carnevali |
| 9,820,752 B2 | 11/2017 | O'Neill |

FOREIGN PATENT DOCUMENTS

| | | |
|---|---|---|
| TW | M541983 B1 | 5/2017 |
| TW | D186957 S | 12/2017 |
| TW | D187765 S | 1/2018 |

OTHER PUBLICATIONS

Extended European Search Report, Application No. EP18884746, dated Jul. 22, 2021 (7 pages).

ADJUSTABLE TIGHTENING APPARATUS

PRIORITY

This application is a continuation-in-part (CIP) of and claims the benefit under 35 U.S.C. § 120 of U.S. patent application Ser. No. 17/182,189 filed Feb. 22, 2021, application Ser. No. 17/182,189 is a CIP of and claims the benefit under 35 U.S.C. § 120 of U.S. patent application Ser. No. 16/202,508 filed Nov. 28, 2018 (issued as U.S. Pat. No. 10,926,929 on Feb. 23, 2021). U.S. application Ser. No. 16/202,508 claims the priority under 35 U.S.C. § 119 of Provisional Application Ser. No. 62/593,908 filed on Dec. 2, 2017. U.S. application Ser. No. 17/182,189, Ser. No. 16/202, 508 and 62/593,908 are incorporated herein by reference in their entirety.

BACKGROUND

Ties are used to tie, fasten and/or connect various items. For example, ties may be used to secure a plurality of loops of cable (e.g., power cord) together for storage. Ties may be used to secure different cables (e.g., power cords, data cables, other cables) that are traversing a similar path together for organization. Ties may be used to secure cables to other objects, such as to a desk, chassis or the like they are being utilized in. Ties, often known as zip ties, are designed for easy application. The zip ties may include an elongated body with teeth and a head through which the body may traverse in a single direction associated with tightening the tie. The zip tie may be placed around the cables to be secured together or around the cables and the object that the cables are to be secured to and then may be tightened by placing the body through the head until the desired tightness is achieved. Typical zip ties cannot be loosened or removed and are thus designed for a single use.

Accordingly, to remove or loosen a zip tie it must be cut. Zip ties may need to be removed or loosened for various reasons including, for example, removing a cable from a bundle of cables, rerouting one or more cables from a bundle of cables, or adding a cable to the bundle of cables. If the cables are still to be bundled and/or held in place a new zip tie must then be utilized. The process of cutting and removing existing ties and routing and securing new ties is not only inconvenient and costly, but may lead to damage to the cables secured therein. For example, damaging one or more cables in a wire harness (bundle of cables) may require the whole wire harness to be replaced. The replacement of wire harnesses is a problem for large production jobs, such as large airliners, as the airlines may include miles and miles of electrical/data cables that need to be replaced, rerouted and resecured.

Releasable cable ties have been proposed but they are not designed to be easily released when they have been used to secure a plurality of cables therein in tight spaces and a user may be wearing gloves. Typical releasable cable ties do not provide a configuration that provides an arrangement where the release mechanism faces away from the cables secured therein to provide more room for a user's hand to be utilized to release the tie, the release mechanism provides a configuration that enables a user to engage therewith whether wearing gloves or not, and/or the release mechanism provides a user with necessary leverage to release the cable tie. What is needed is a releasable cable tie that provides these features.

BRIEF DESCRIPTION OF THE DRAWINGS

The structure, objects, and advantages of the releasable cable tie will be understood by referring to the detailed description of illustrative embodiments in conjunction with the accompanying technical drawings, in which.

DETAILED DESCRIPTION

A zip tie to secure items therewithin that can be loosened and/or released to allow the items to be removed therefrom and then be reused. The zip tie includes an elongated strap having teeth formed thereon that engage with teeth in a locking head to allow movement in only one direction (tightening). The locking head also includes a releasing mechanism that enables the teeth in the locking head to be disengaged from the teeth on the elongated strap so that the strap can move in an opposite direction that enables loosening of the strap or removal of the strap. The release mechanism is configured to face away from the items secured within the strap to provide more room for engagement (e.g., by a user's hand), enable a user to engage therewith whether wearing gloves or not, provide necessary leverage to release the cable tie without need to press the tie against other items (e.g., cables, chassis), and provide an option for securing excess strap therewithin.

Figure 1A:
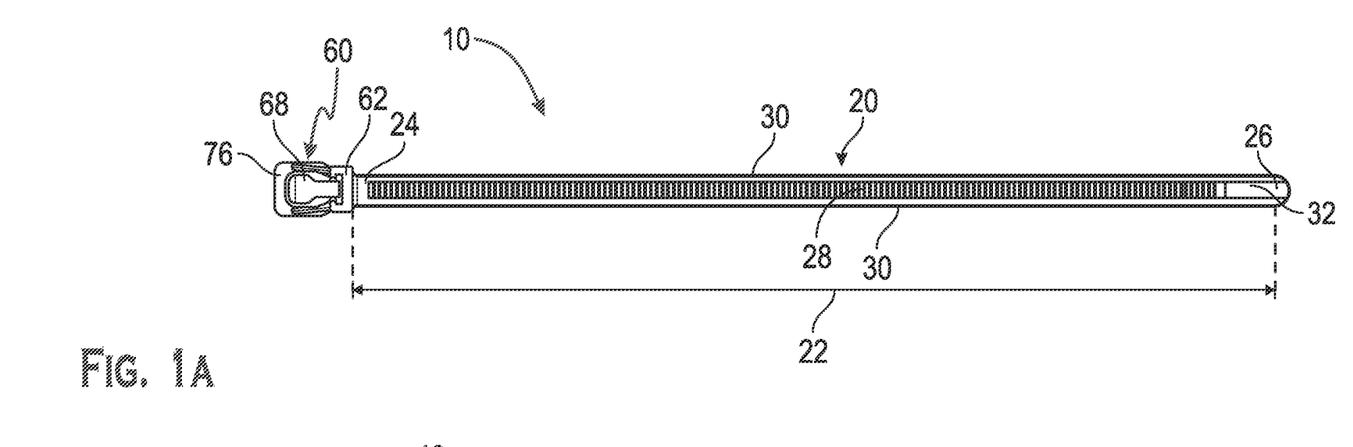
FIGS. 1A-B illustrate top views of an example releasable cable tie in open configurations, according to one embodiment.
Figure 1B:
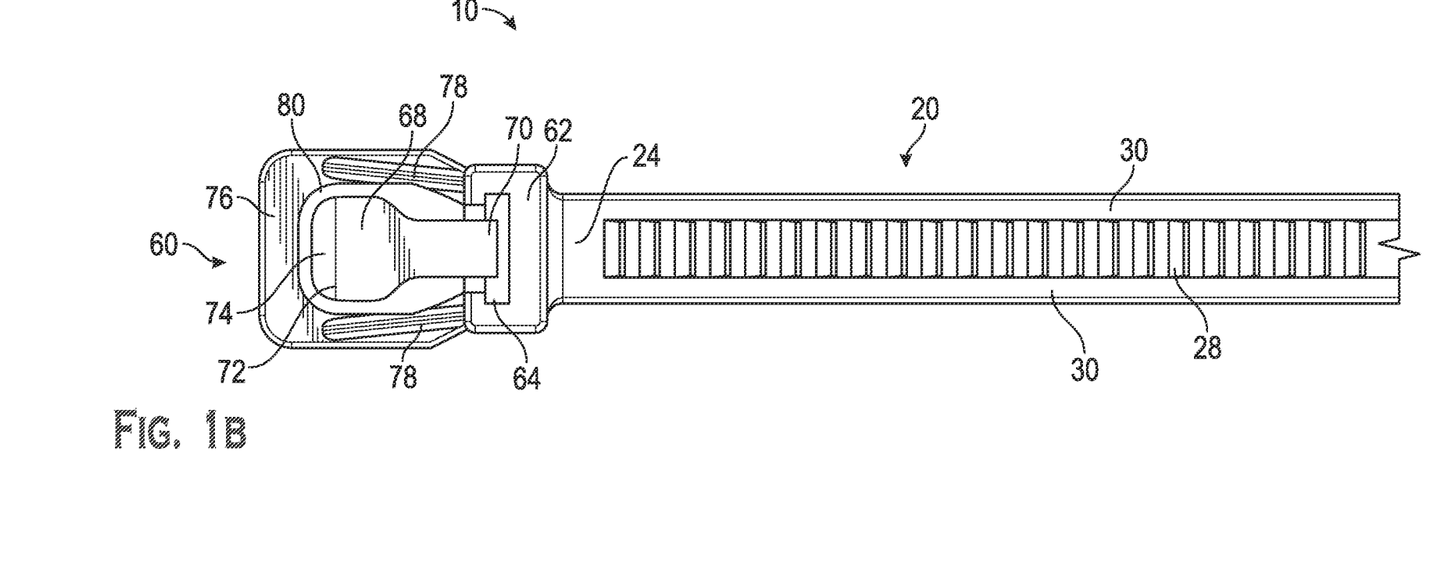

FIG. 1A illustrates top view and FIG. 1B illustrates a close-up top view of an example releasable tie 10 that can be used as an adjustable tightening apparatus. The tie 10 includes an elongated planar strap 20 and a releasable locking head 60. The strap 20 has an elongated length 22 that traverses from a first end 24 to a second end 26. A first side (e.g., top side) of the strap 20 includes teeth 28 formed within guide rails 30. The strap teeth 28 may be saw tooth shaped where on side is flat and the other side is angled. The first end 24 is connected to the locking head 60. The second end 26 of the of strap 20 includes a tongue 32 (with no teeth) that assists in guiding the strap 20 into the locking head 60 and requires a minimum amount of the strap 20 to pass through the locking head 60 before the strap 20 is secured therein (prevented from being removed).

The locking head 60 includes a main body 62 (wider than the strap 20) having an opening 64 formed therein that is sized to enable the strap 20 to pass therethrough. When the strap 20 passes through the opening 64 the locking teeth 28 will point toward a far end of the opening 64 (end away from the strap 20). Extending into the opening 64 from the far end thereof and pointing toward a near end (end close to strap 20) are one or more teeth 66 to engage with the strap teeth 28. It should be noted, the one or more locking head teeth 66 and the strap teeth 28 within the opening 64 are not visible in the top views of FIGS. 1A-B. The engagement of the one or more locking head teeth 66 and the strap teeth 28 within the opening 64 enable the strap 20 to pass through the opening 64 in a first direction (tightening) but not in a second direction (loosening, removing).

A release tab 68 extends from an upper side (top) of the main body 62 in a direction away from the strap 20 (e.g., substantially parallel to strap 20 in a steady state). The far end of the main body 62 includes an open portion that enables a first side 70 of the release tab 68 to extend into the opening 64 and connect to the one or more locking head teeth 66. A second side 72 of the release tab 68 is wider than the first side 70 to provide a larger surface for receiving at least a portion a finger (e.g., thumb) of a user. The second side 72 of the release tab 68 may include a ripple strip (raised portion) 74 to provide the user an indication their finger is at the end thereof and potentially prevent the user's finger from slipping off and/or to assist in maintaining the users finger thereon. While not visible in FIGS. 1A-B, when the release tab 68 is engaged (pressed downward), the first side 70 pivots upward and outward from the opening 64 and the one or more one or more locking head teeth 66 pivot toward a far end of the opening 64 so as to disengage from the strap teeth 28 and enable the strap 20 to move through the opening 64 in the second direction (loosened, removed).

A backplate 76 extends from a lower side (bottom) of the main body 62 in a direction away from the strap 20 (e.g., substantially parallel to the strap 20 and also substantially parallel to the release tab 68 when not being depressed). The backplate 76 may be connected to, and extend from, the bottom of the sides of the main body 62. According to one embodiment, the backplate 76 may get wider as it extends from the main body 62. The backplate 76 may be wider and longer than the release tab 68 and have substantially the same shape. To provide support for the backplate 76, sidewalk 78 may extend from sides of the main body 62 and connect to the backplate 76. The sidewalls 78 may be angled downward from the main body 62 as will be more visible in side views.

The backplate 76 is configured to receive at least a portion of a user's finger (e.g., index finger) to enable a user to provide support (e.g., resistance) when the release tab 68 is being depressed. According to one embodiment, the backplate 76 may include an opening 80 formed therein. The opening 80 may be larger than the release pad 68 and have substantially the same shape as the release pad 68. The opening 80 ensures that the backplate 76 does not interfere with the depressing of the release pad 68. The opening 80 may also provide an edge for a user's finger to secure thereto to potentially prevent the user's finger from slipping off and/or to assist in maintaining the users finger thereon.

Figure 2A:
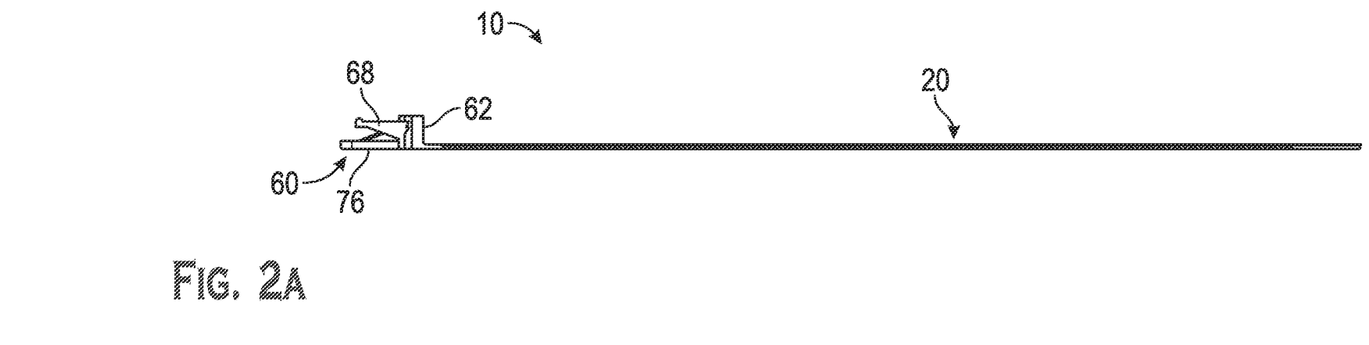
FIGS. 2A-B illustrate cross sectional side views of an example releasable cable tie in open configurations, according to one embodiment.
Figure 2B:
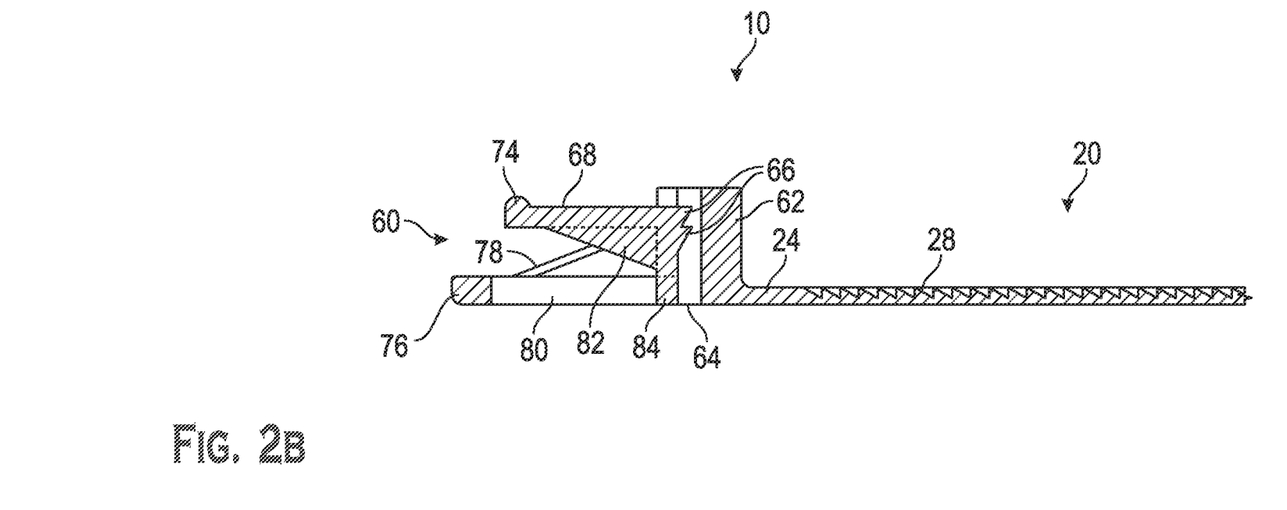

FIG. 2A illustrates a cross-sectional side view and FIG. 2B illustrates a close-up cross-sectional side view of the example releasable tie 10. The one or more locking head teeth 66 (two illustrated but not limited thereto) extend into the opening 64 from a far side thereof and point toward a near side thereof. The one or more locking head teeth 66 are connected to a first end 70 of the release tab 68 which traverses away from the main body 62 and the strap 20. The release tab 68 includes the ripple strip 74 at the second end 72 thereof. The release tab 68 may include a support wall 82 centrally located that diagonally extends from a point in proximity to the second end 72 to a fulcrum 84 that is located under the one or more locking head teeth 66. The fulcrum 84 acts as a pivot point so that when the release tab 68 is depressed, the one or more locking head teeth 66 more upward and backward until they disengage with the one or more strap teeth 28. When the teeth 66 and the teeth 28 are disengaged the strap 20 may be moved in the second direction (release or removable direction).

The backplate 78 extends from the main body 62 past the release tab 68. The opening 80 in the backplate 78 extends from the main body 62 (or close thereto) until past the release tab 66 so as to not interfere with the release tab 68 being depressed and to provide the other potential benefits discussed above.

Figure 3:
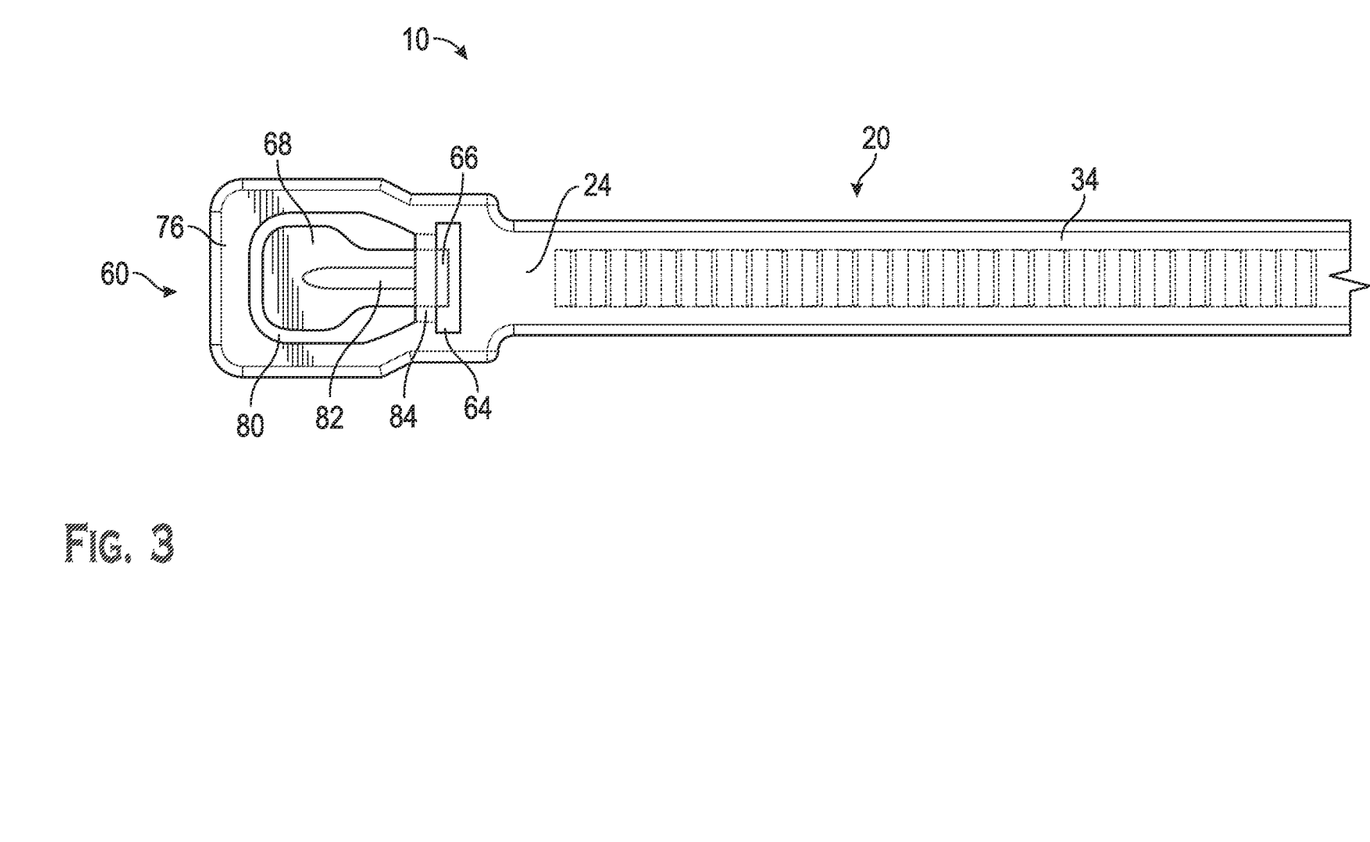
FIG. 3 illustrates a bottom view of an example releasable cable tie in an open configuration, according to one embodiment.

FIG. 3 illustrates a bottom view of the example releasable tie 10. The opening 80 in the backplate 78 is clearly shown larger that the release tab 68. The opening 80 may enable excess strap 20 to be secured therein (see for example FIGS. 6A-B) or may be used to secure the releasable tie 10 to a hook, connector, tab or the like 100 (see for example FIG. 6C). The last of the one or more locking head teeth 66 can be seen extending into the opening 64. The fulcrum 84 can be seen in front of the opening 64 below the one or more locking teeth and the first end of the release tab 68. The support wall 82 is shown extending to the fulcrum 84. An underside 34 of the strap 10 may be smooth opposite the teeth 28 on the topside.

Figure 4:
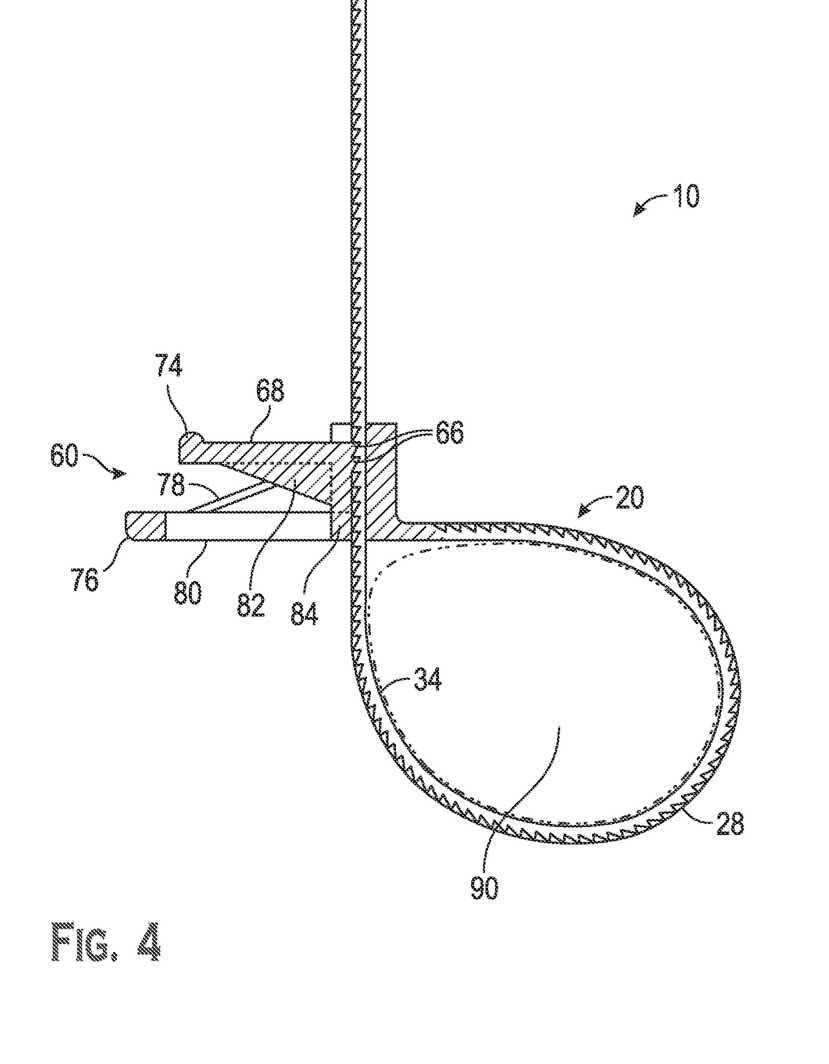
FIG. 4 illustrates a cross sectional side view of an example releasable cable tie in a closed (tied) configuration, according to one embodiment.

FIG. 4 illustrates cross-sectional side view of the example releasable tie 10 in a locked position. When the strap 20 passes through the locking head 60 a loop 90 is formed for tightening around items (no items illustrated) to, for example, secure them together or secure them in place. The strap teeth 28 are located on an outside of the loop 90 and the bottom 34 of the strap faces the loop 90 and the items secured therein. As illustrated, the bottom 34 is smooth so that so there is no impact to the items when tightened. The release tab 68 and the backplate 76 of the locking head 30 extend substantially perpendicular to the strap 20 in a direction away from the loop 90. The location of the release tab 68 and the backplate 76 provides a user easy access thereto.

Figure 5:
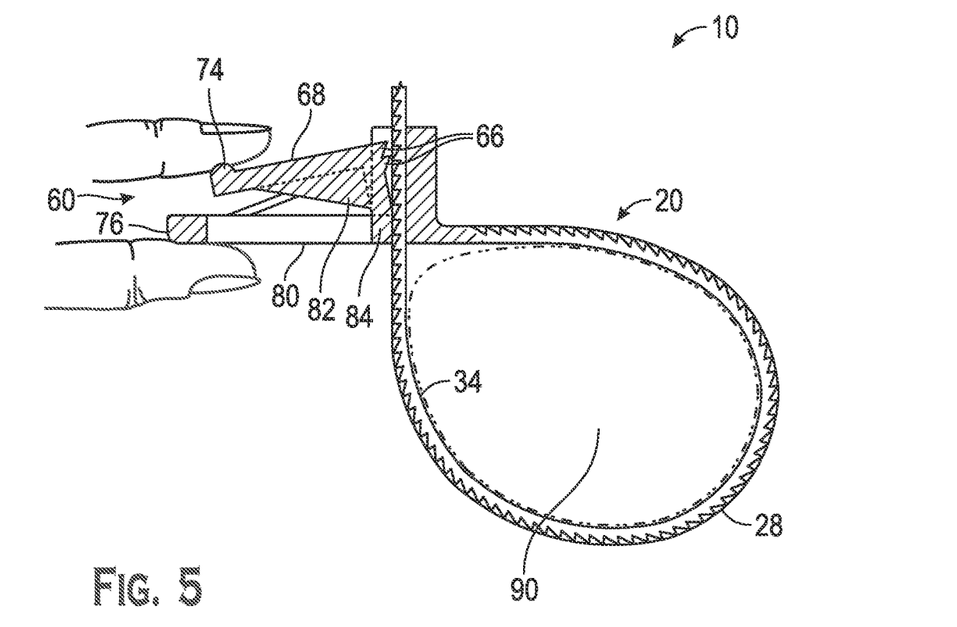
FIG. 5 illustrates a cross sectional side view of an example releasable cable tie in a closed (tied) configuration being released utilizing two fingers, according to one embodiment.

FIG. 5 illustrates a cross sectional side view of the strap 10 in a closed configuration where a first finger is utilized to push the release tab 68 downward and a second finger is located below the backplate 76 to provide support (leverage) thereto. Once the release tab 68 is depressed and the teeth 66 are disengaged from the teeth 28, the strap 20 can be moved in a release direction to either expand the loop 90 or remove the strap 20 from the locking head 60. As the locking head 60 is held by the two fingers, the locking head 60 may actually be moved with respect to the strap 20. As illustrated, the locking head 60 may be moved in an upward direction to expand the loop 90 and if desired remove the locking head 60 from the strap 20. The use of the release tab 68 and the backplate 76 extending away from the loop 90 for easy access and the relatively large size thereof to receive fingers enables the releasable tie 10 to be easily connected and released as needed. Furthermore, the releasable tie 10 may be operated in tight spaces and whether the user is wearing gloves or not.

The example releasable tie 10 preferably is molded in one piece integrally from thermoplastic, such as nylon or polypropylene and possesses sufficient strength and resiliency to permit the desired working thereof as well as the desired latching and release.

Figure 6A:
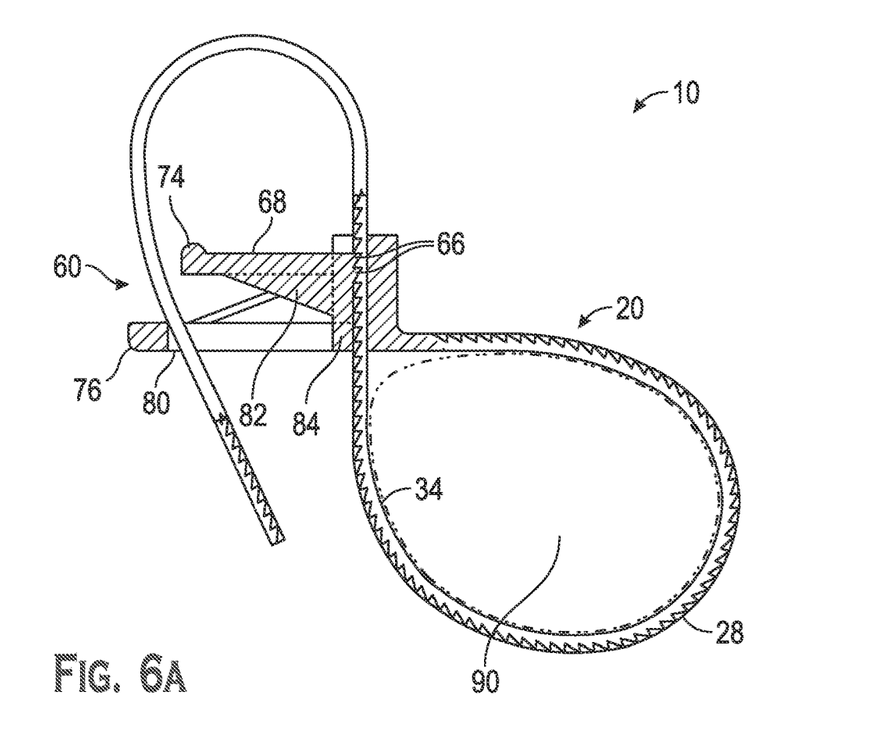
FIGS. 6A-B illustrate cross sectional side views of an example releasable cable tie in closed configurations where excess strap is tucked within an opening in a backplate of the locking head, according to various embodiments.
Figure 6B:
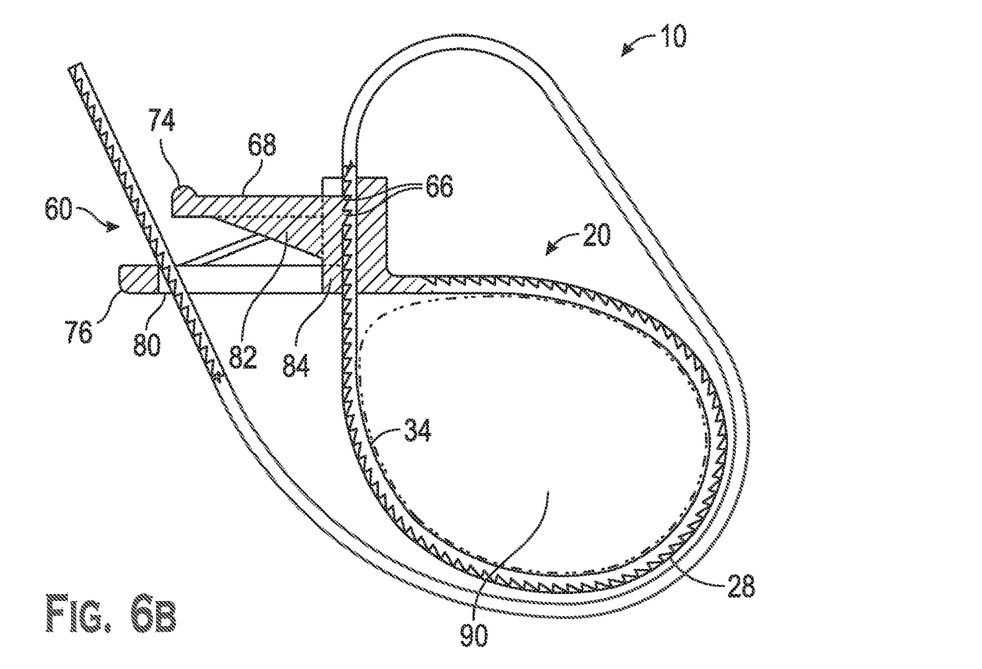
Figure 6C:
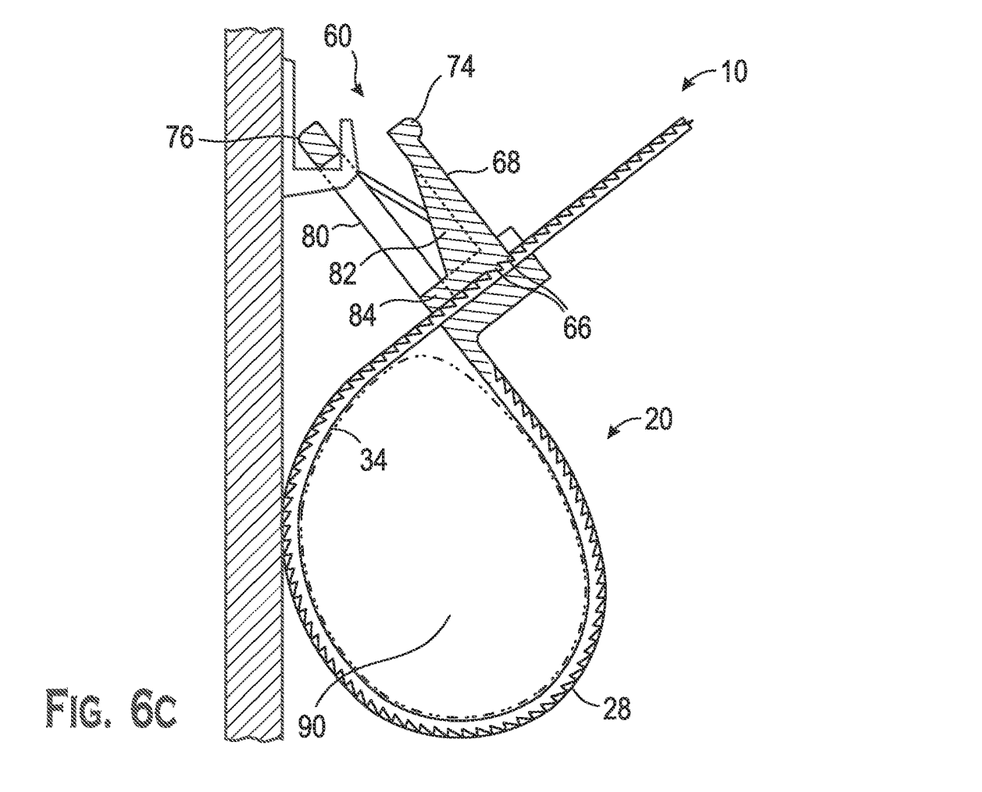
FIG. 6C illustrates a cross sectional side view of an example releasable cable tie in a closed configuration where an opening in a backplate of the locking head is used to hang the tie, according to one embodiment.

According to one embodiment, the opening 80 may enable excess strap 20 (portion of strap 20 that passed through the locking head 60) to be secured therein. As illustrated in FIG. 6A, the excess strap 20 is looped back and tucked in the opening 80. This arrangement may provide a barrier to the release tab 68 inadvertently being depressed and releasing the strap 20. As illustrated in FIG. 6B, the excess strap 20 is wrapped around the items being secured thereby and is tucked into the opening 80. According to one embodiment as illustrated in FIG. 6C, the opening 80 may be used to secure the releasable tie 10 to a hook, connector, tab or the like 200 that may be mounted to a wall, ceiling, chassis or the like 210.

According to one embodiment, the bottom of the releasable tie 10 may be a surface that provides friction to prevent it from sliding off of items that it is securing. The friction surface may be molded into the tie 10 or may be a friction material that is secured to a bottom of the tie 10 in some fashion (e.g., glued, Velcro'ed®, stitched).

Figure 7A:
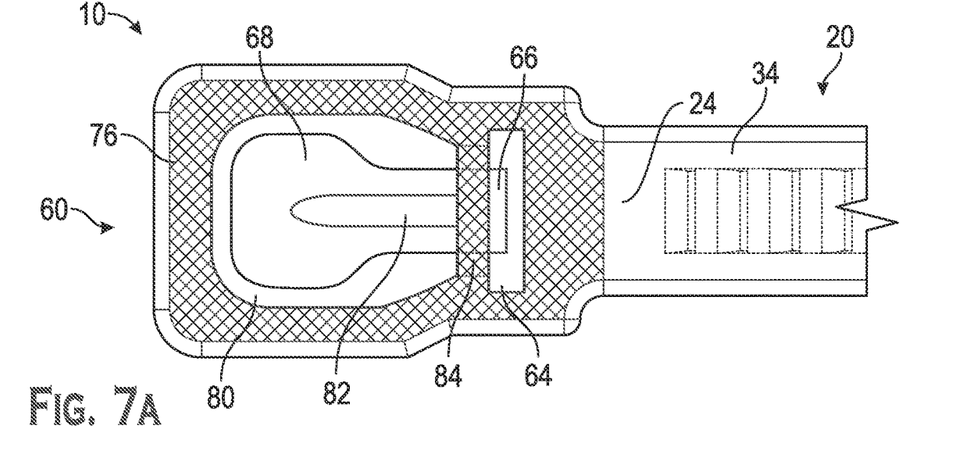
FIGS. 7A-C illustrate bottom views of an example releasable cable tie having different friction bottom surfaces, according to various embodiments.
Figure 7B:
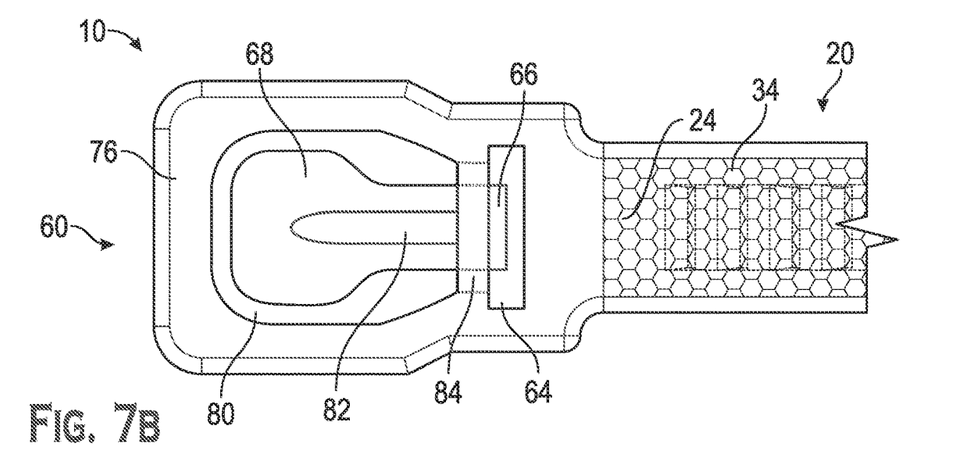
Figure 7C:
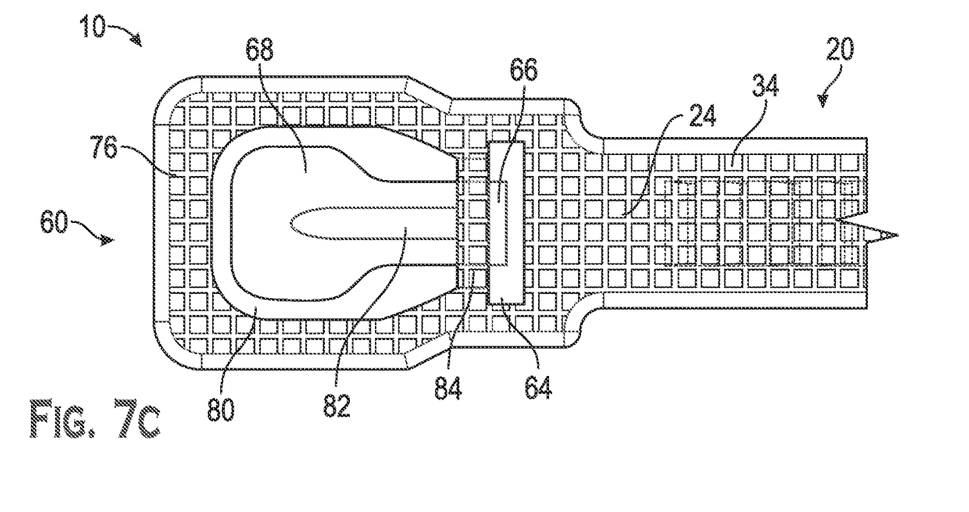

FIGS. 7A-C illustrate bottom views of several embodiments of example ties having a friction bottom surface. FIG. 7A illustrates an example tie where a friction surface 220 is located below the locking head (on bottom of backplate 76). FIG. 7B illustrates an example tie where a friction surface 230 is located below the strap 20. FIG. 7C illustrates an example tie where a friction surface 240 is located below both the locking head 60 and the strap 20.

The friction surfaces 220, 230, 240 are illustrated as a cross-hatched, hexagons and squares but are not limited thereto. Any surface capable of providing friction may The friction surfaces 220, 230, 240 may be formed into the lower surface when the releasable tie 10 is manufactured. Alternatively, the friction surfaces 220, 230, 240 may be formed in the lower surface subsequent to the tie 10 being formed (e.g., machined into lower surface). According to one embodiment, the friction surfaces 220, 230, 240 may be separate components that are secured to the lower surfaces in some fashion (e.g., glue, Velcro®, stitching).

FIGS. 8A-D illustrate top views of example releasable ties with connection mechanisms added thereto. The connection mechanism may enable the tie and any contents secured therein to be secured to an object (e.g., wall, ceiling, chassis, cabinet, desk). The connection mechanism may be secured to the locking head 60. The connection mechanisms may be a body (e.g., tab, eyelet or the like) extending from the locking head 60 having a hole(s) formed therein that enable the tie to be connected to an object with a screw, nail, rivet or the like or to be connected to a hook or the like mounted to the object. Alternatively, the connection mechanism may be a protrusion (e.g., screw, pin, rivet or the like) extending therefrom that may be used to mount to an object.

Figure 8A:
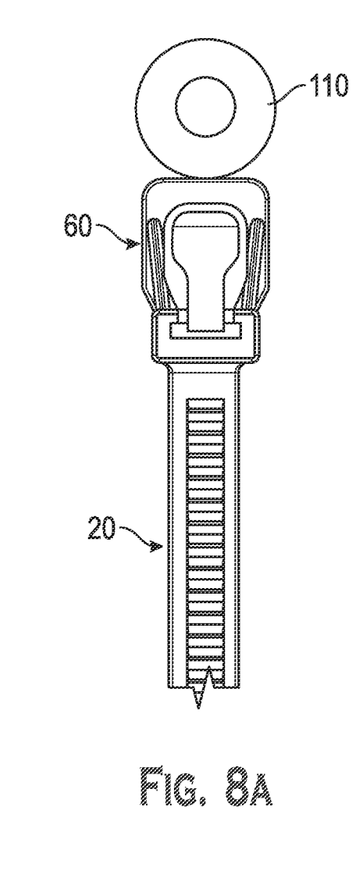
FIGS. 8A-D illustrate top views of example releasable ties with various connection devices secured to locking heads thereof, according to various embodiments.
Figure 8B:
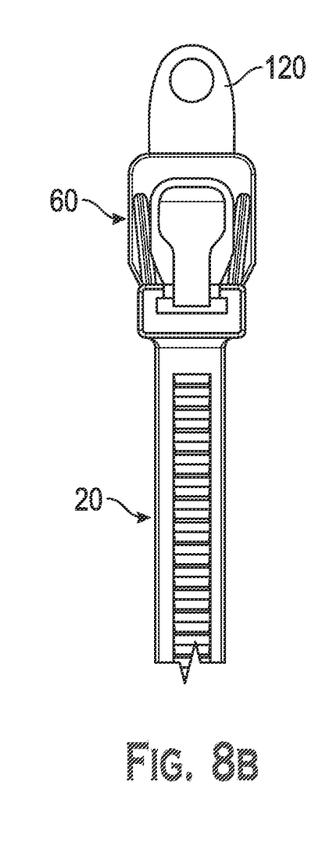
Figure 8C:
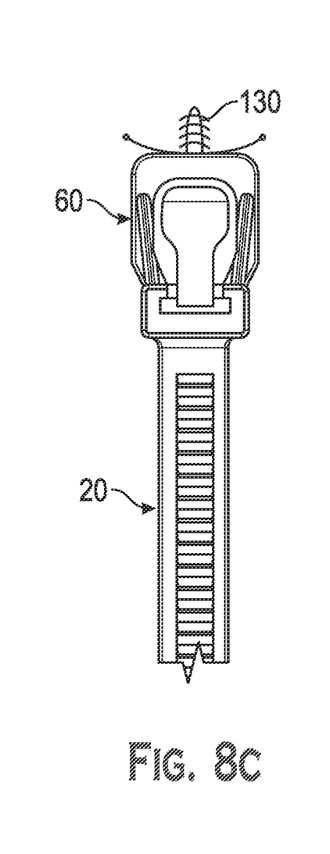
Figure 8D:
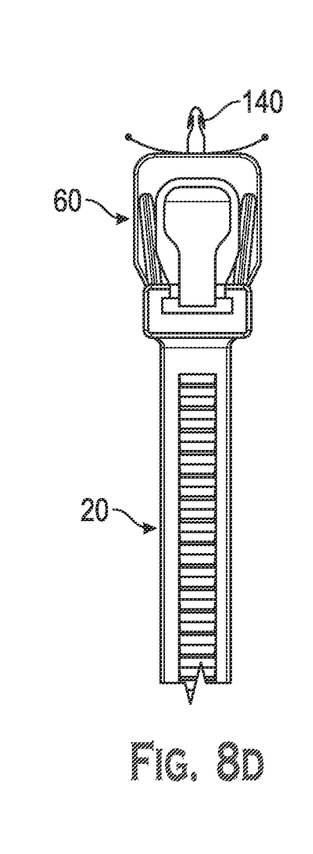

FIG. 8A illustrates a top view of an example tie that includes a body (an eye loop 110) extending from the locking head 60 (specifically the backplate which is not numbered). The eye loop 110 may be used to receive a screw, nail, rivet or the like therethrough to secure the tie to an object (e.g., chassis). Alternatively, the eye loop 110 may be utilized to secure around a hook, tab, pin or the like that is extending from an object that the tie is to be secured to. FIG. 8B illustrates a top view of an example tie that includes a body (a mounted head 120) extending from the locking head 60 (backplate). The mounted head 120 includes a hole formed therethrough to enable a screw or the like to secure the tie to an object or to place around a hook or the like that is extending from an object that the tie is to be secured to. FIG. 8C illustrates a top view of an example releasable tie that includes a screw mount 130 extending from the locking head 60 (backplate). The screw mount 130 can be utilized to secure the tie to an object (e.g., chassis) by screwing the screw mount 130 into a threaded hole formed in the object. FIG. 8D illustrates a top view of an example tie that includes a protrusion (a pin push mount 140) extending from the locking head 60 (backplate). The pin push mount 140 may include flanges (not numbered at an end thereof). The pin push mount 140 can be utilized to secure the tie to an object (e.g., chassis) by pushing the push mount 140 through a hole formed in the object where the flanges secure the tie within the hole.

Figures 8E, 8F:
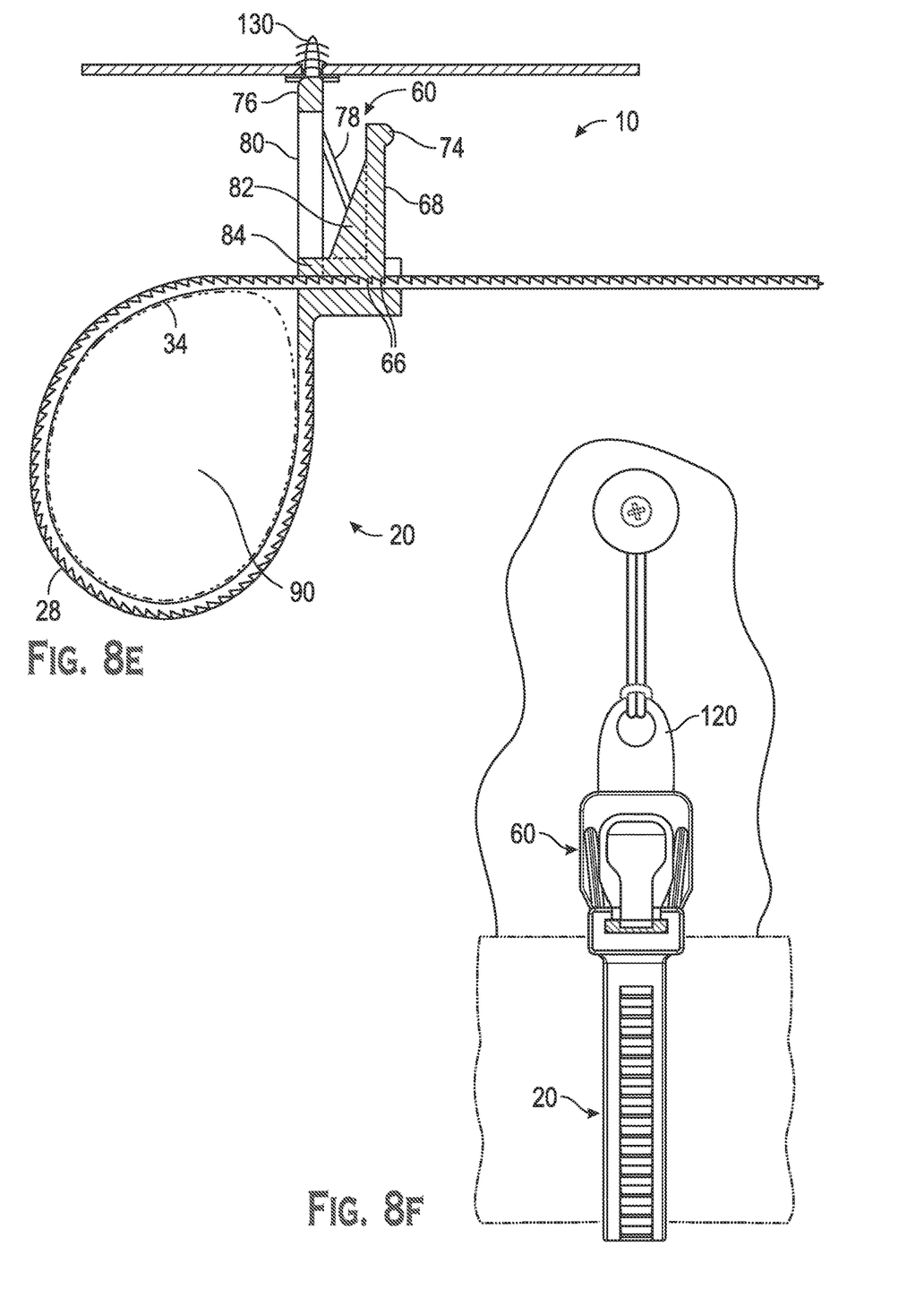
FIGS. 8E-F illustrate a cross sectional side view and top view of example releasable ties secured to objects, according to various embodiments.

FIG. 8E illustrates a cross sectional side view of an example releasable tie having a protrusion (screw mount 130) being secured to an object (e.g., ceiling, chassis) 250. The screw mount 130 is formed on the end of the backplate 76. The screw mount 130 is screwed into a threaded hole in the object 250. FIG. 8F illustrates a front view of an example tie having a body (mounted head 120) being used to secure the tie and to an object (e.g., ceiling, chassis) 265. The mounted head 120 is formed on the end of the backplate 76. The mounted head 120 has a strap tied 270 through the hole and the other side of the strap 270 is secured to a screw/washer 260 that are secured to the object 265.

Figure 9A:
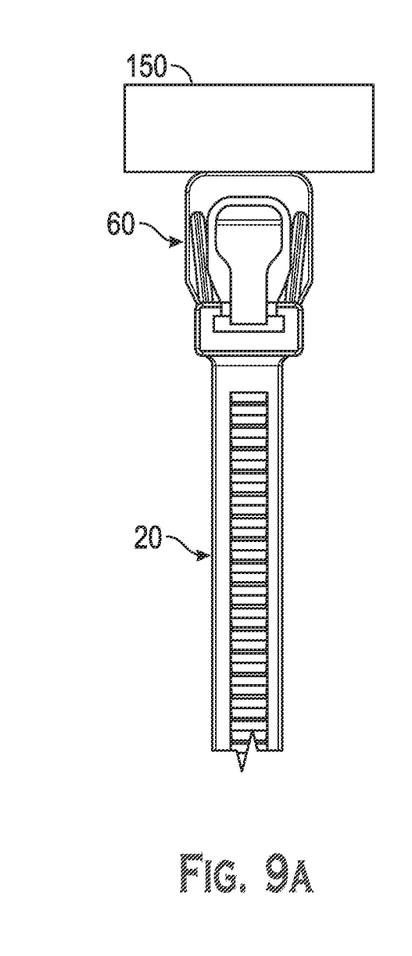
FIGS. 9A-C illustrate top views of example releasable ties with labels secured to a locking head thereof and using the label to identify items secured therein, according to various embodiments.
Figure 9B:
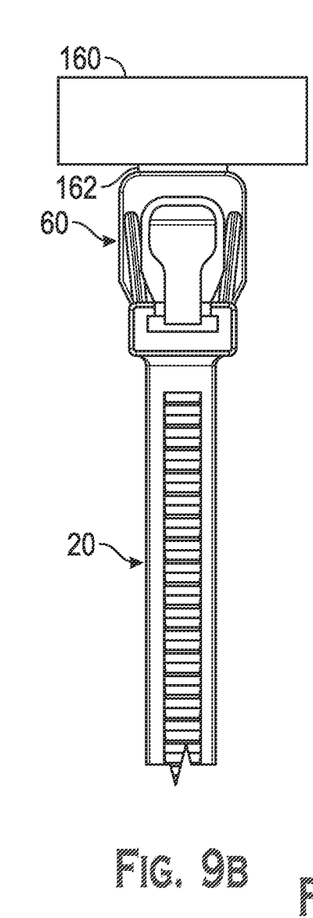
Figure 9C:
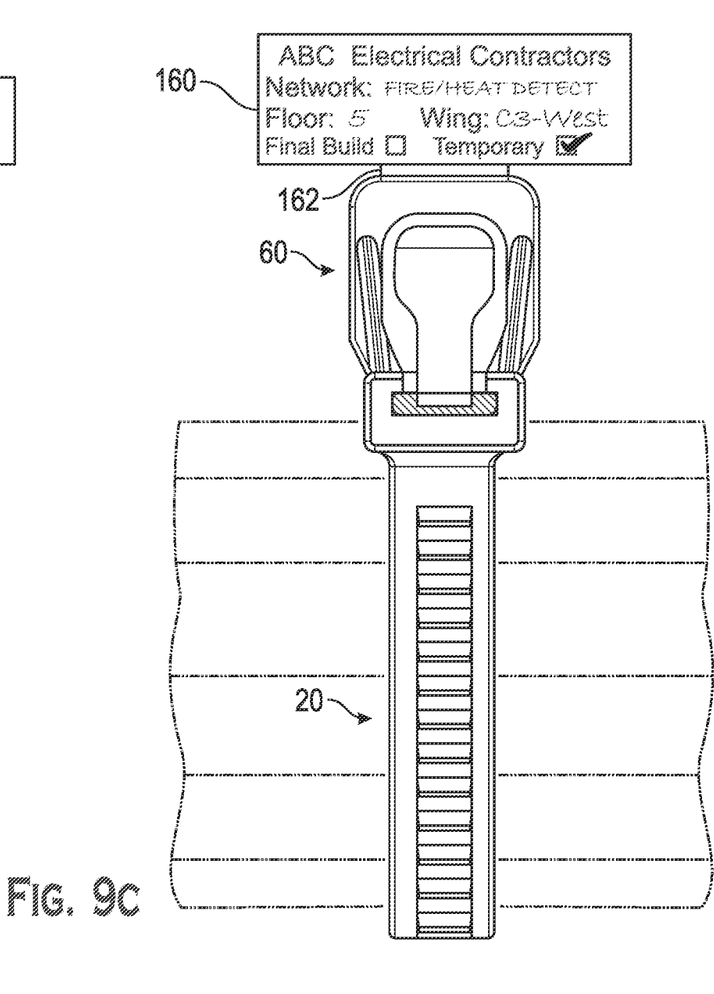

FIGS. 9A-B illustrate example releasable ties that include labels 150, 160 respectively extending from the backplate (not numbered) of the locking head 60. The labels 150, 160 may be used to identify the items that are secure therein. The label 150 may extend directly from the backplate (FIG. 9A) or a tab 162 may extend from the backplate and the label 160 may extend from the tab 162 (FIG. 9B).

Figures 10A, 10B:
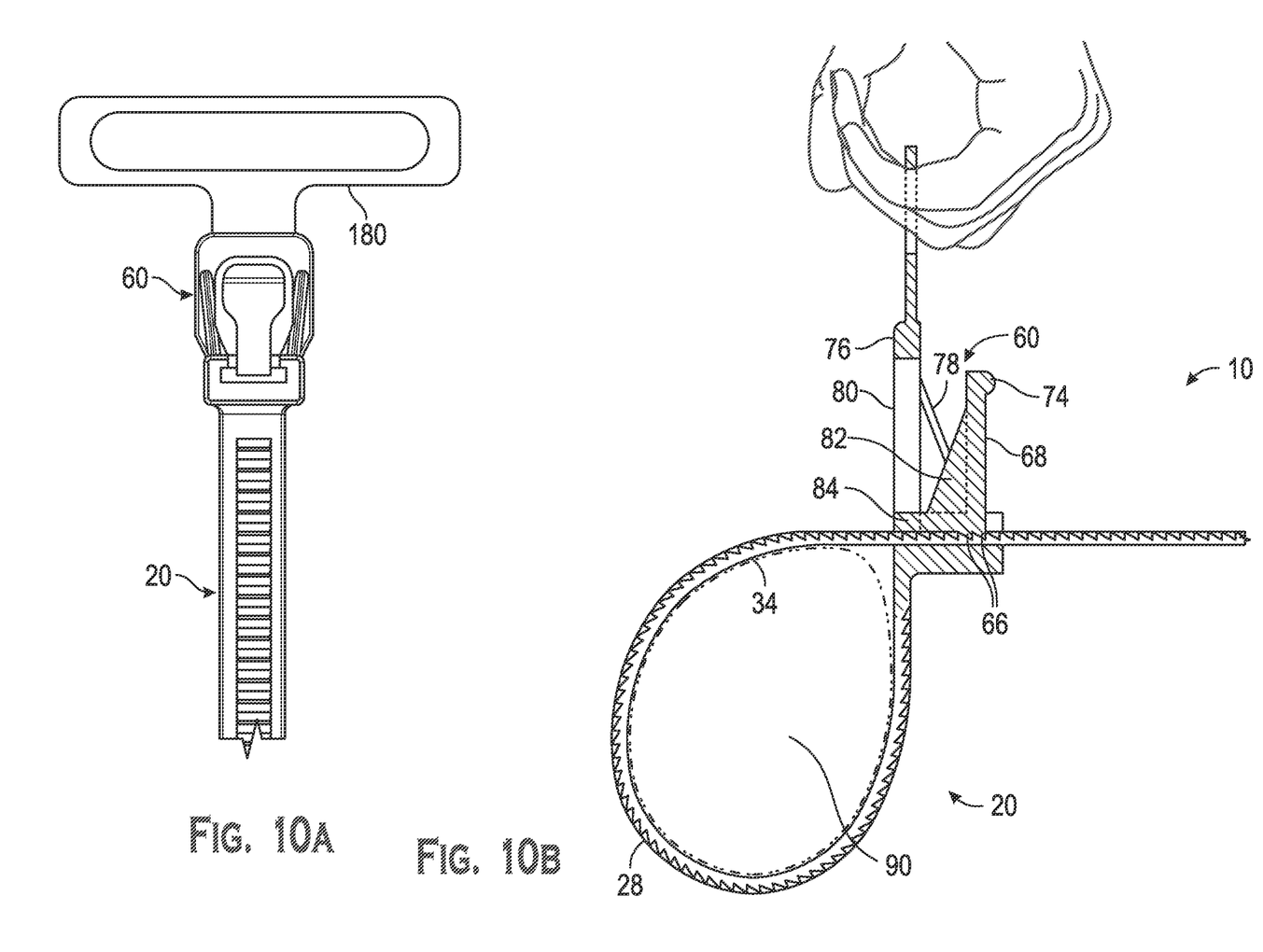
FIGS. 10A-B illustrate a top view of an example releasable tie with a handle and a cross sectional side view using the handle to carry the items secured therein, according to one embodiment.

FIG. 10A illustrates a top view of an example releasable tie that includes a handle 180 extending from the backplate (not numbered) of the locking head 60. The handle 180 may be used for carrying items that have been bundled together. For example, the handle 180 could be utilized to carry a power cord that has been wrapped and secured together with the tie. FIG. 10B illustrates a cross sectional side view of the handle 180 being utilized to carry the strap and any items (none illustrated) secured therein.

Figure 11A:
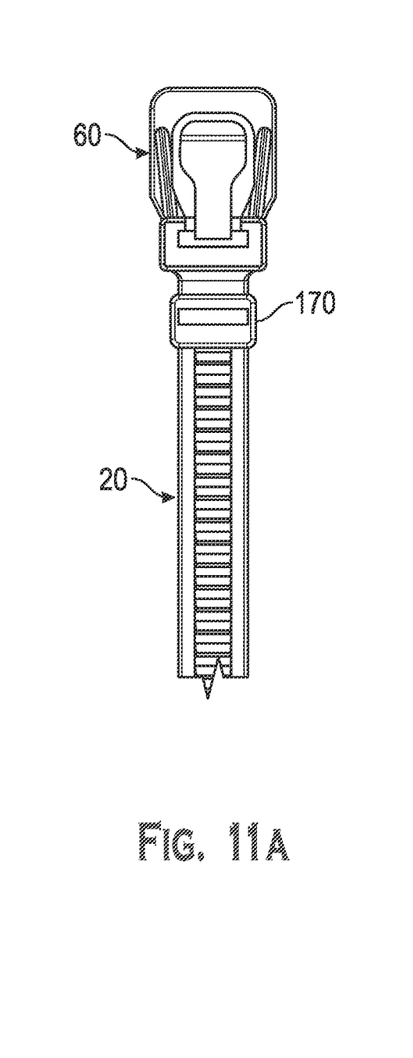
FIGS. 11A-G illustrate top/side views of example releasable ties having a pass through formed in the strap that enables the tie to be secured to an object before the tie is used, according to various embodiments.

FIG. 11A illustrates a top view of an example releasable tie that includes a passthrough 170 formed on a portion of the strap 20 prior to the locking head 60. The passthrough 170 may enable the strap 20 to pass therethrough to, for example, secure the tie to an item it is to be utilized with before the apparatus is tightened in use. For example, the tie may be secured to an end of a power cord by passing the strap 20 through the passthrough 170 so that the tie is located on the power cord when the power cord is in use and is already in place when the power cord is wrapped for storage.

By way of another example, the tie may be secured to an item (e.g., chassis, desk) that will have a plurality of cables traversing thereby. Once the cables are run the tie can be used to secure the cables in an organized fashion to the item.

Figures 11B, 11C:
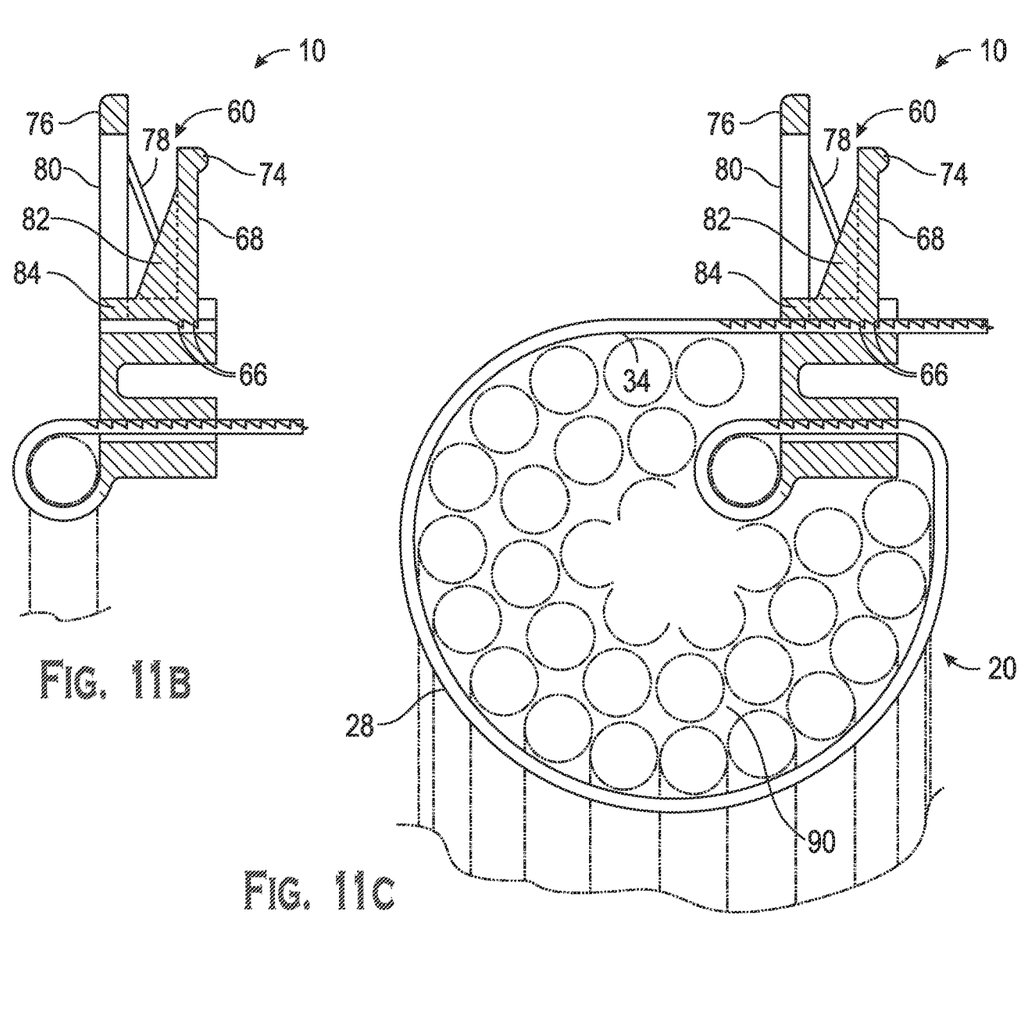

FIG. 11B illustrates a cross sectional side view of an example tie wrapped around an item 280 using the passthrough 170 prior to the tie being used to releasably secure the item to itself or to other items. For example, the item 280 may be a power cord where the tie is secured thereto before the power cord is wrapped and secured together by passing the strap 20 through locking head 60. The item 280 may be a portion of a chassis or desk so that the tie is secured in place and then can be utilized once other items (e.g., cables, cords) are run and are to be secured releasable tie. FIG. 11C illustrates a cross sectional side view of an example tie wrapped around an item 280 by passing the strap 20 through the passthrough 170 and then around other items 290 using by passing the strap 20 through the locking head 60. It should be noted that the item 280 may be the same as the items 290 (for example both may be a power cord) or may be different (for example, chassis and cables). The items 290 may all be the same (for example one cord wrapped several times) or may be different items (for example different cables and/or cords run in a chassis).

The passthrough 170 illustrated in FIGS. 11A-C does not include any manner for securing the strap 20 therewithin. That is, the strap 20 may traverse the passthrough in either direction and be removed in either direction. As such, it is possible that the tie could come lose from the item 280 it is placed on. According, to one embodiment, the passthrough 170 may include a means for holding the strap 20 in place on the item 280.

Figures 11D, 11E:
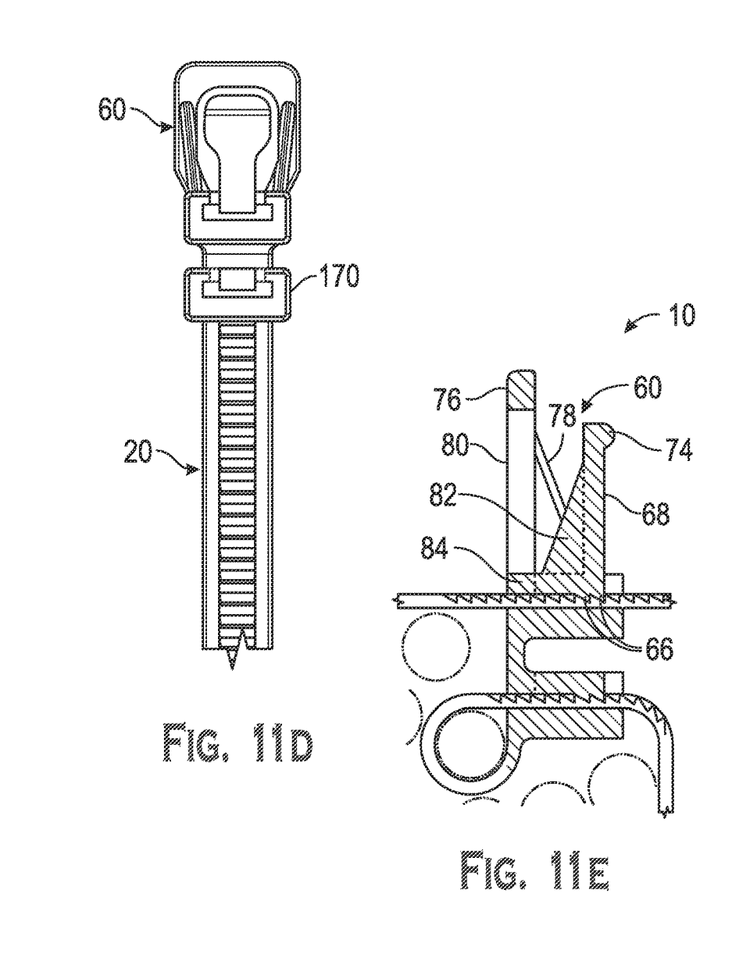

FIG. 11D illustrates top view of an example releasable tie where the passthrough 170 includes one or more teeth 172 extending into the opening of the passthrough 170. As illustrated, the one or more teeth 172 enter the opening from a far side (side closet to locking head 60). This enables the strap 20 to enter in a direction where the teeth 28 face the far end of the opening so that they engage with the teeth 172. As such, the strap 20 may traverse the passthrough in a first (tightening) direction but not a second (loosening, removing) direction. FIG. 11E illustrates a cross sectional side view of the example tie showing the teeth 172 engaging with the teeth 28 in the strap 20 in order to secure the tie to the item 280. In addition, while not fully illustrated the tie is also wrapped around the items 290 by passing the strap 20 through the locking head 60 (teeth 66 engaging teeth 28).

The passthrough 170 illustrated in FIGS. 11D-E enables the strap tie to be secured to the item 280 to prevent it from accidentally being removed. However, once the tie is placed on the item 280 it may not be removed (e.g., acts as permanent tie). As such, the tie 170 is basically a one use (or one item 280) tie. According to one embodiment, the passthrough 170 may include a means for releasing the strap 20 from the passthrough 170 once in place on the item 280.

Figure 11F:
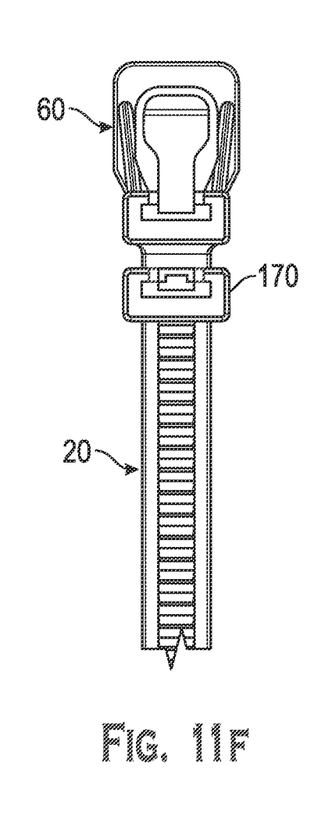
Figure 11G:
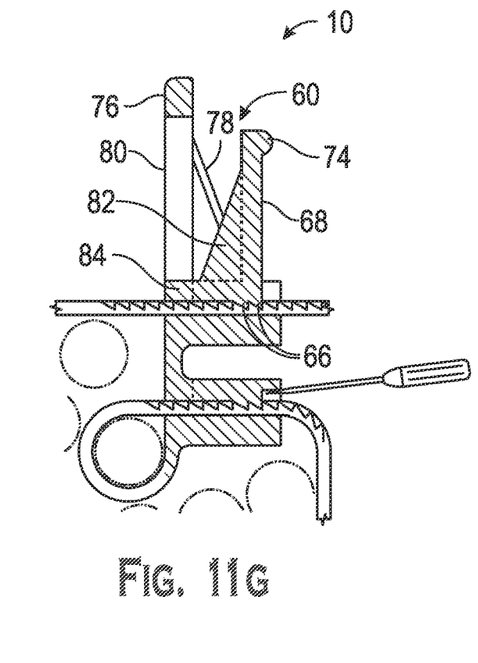

FIG. 11F illustrates top view of an example releasable tie where the passthrough 170 includes an opening 174 located therein that enables a back side of the one or more teeth 172 to be depressed causing the teeth 172 to rotate upward and backward and disengage from the strap teeth 28 and enable the strap 170 to be removed from the item 280. FIG. 11G illustrates a cross sectional side view of the example tie showing a tool 176 being used within the opening 174 to disengage the teeth 172 from the teeth 28. While not fully illustrated the tie is also wrapped around the items 290 by passing the strap 20 through the locking head 60 (teeth 66 engaging teeth 28).

The example releasable tie described herein could include additional features without departing from the scope thereof. While the example releasable tie has been described with respect to securing cables together and/or to items that the cables traverse the releasable ties are in no way intended to be limited thereto. Rather the releasable ties can be utilized to secure and types of items tother or to other items without departing from the current scope as the use of the release tab and backplate provides for a comfortable two finger release, whether the user is wearing gloves or not and whether the user suffers from arthritis or any other condition that limits the use of the user's fingers. For example, the releasable ties could be utilized to secure luggage to a roof rack, to tie ends of material together, to secure a tag to equipment, and/or to secure a bag with a broken zipper together.

According to one embodiment, the releasable ties could be utilized in the medical field. For example, the releasable tie could be utilized as a tourniquet. A user could easily tighten or loosen the strap as needed around a limb to apply necessary pressure to control venous and arterial circulation. Once the desired amount of tension is reached, the strap will easily lock into place holding the pressure to the limb for any period of time. The user can then relieve or tighten pressure as needed to avoid tissue damage.

Although the invention has been illustrated by reference to specific embodiments, it will be apparent that the invention is not limited thereto as various changes and modifications may be made thereto without departing from the scope. Reference to "one embodiment" or "an embodiment" means that a particular feature, structure or characteristic described therein is included in at least one embodiment. Thus, the appearances of the phrase "in one embodiment" or "in an embodiment" appearing in various places throughout the specification are not necessarily all referring to the same embodiment.

The various embodiments are intended to be protected broadly within the spirit and scope of the appended claims.

The invention claimed is:

1. An adjustable tightening apparatus, comprising:
    an elongated planar strap having a plurality of strap teeth formed on one side thereof; and
    a releasable locking head formed adjacent to a first end of the strap, wherein the locking head includes
        a main body having an opening therethrough to receive a second end of the strap in a locking direction to form a loop to secure around one or more items such that the strap teeth are positioned external to the loop and away from the one or more items, and wherein amount of the strap that traverses the opening controls size of the loop;
        at least one locking head tooth extending into the opening and being complementary to the plurality of strap teeth when the second end of the strap enters the opening, wherein the at last one locking head tooth is adapted to engage with at least one strap tooth for preventing movement of the strap in a release direction;
        a release pad engaged with a first side of the main body and having a first side connected to the at least one locking head tooth and a second side extending away from the first side of the strap, wherein the second side of the release pad is wider than the first side and includes a ripple strip in close proximity to the second side thereof; and
        a backplate engaged with a first side of the main body and having a first side adjacent the opening and a second side extending away from the first side of the strap, wherein the backplate is substantially parallel to the release pad, wherein the backplate is wider and longer than the release pad, and wherein the backplate includes an opening therethrough larger than the release pad;

wherein the release pad and backplate extend away from the loop secured around the one or more items when the strap is in the opening and are accessible by a user, wherein the release pad is configured to be depressed by a first finger of the user and the ripple strip is to engage the first finger in order to prevent the first finger from sliding off, wherein the backplate is configured to receive a second finger of the user to provide resistance when the release pad is depressed toward the backplate by the first finger, wherein the opening in the backplate is to engage the second finger in order to prevent the second finger from sliding off, wherein the depressing of the release tab is to release the at least one locking head tooth from engagement with the at least one strap tooth to permit the strap to be moved in the release direction.

2. The apparatus of claim 1, wherein the second end of the strap extending past the locking head can be secured within the opening in the backplate.

3. The apparatus of claim 1, wherein the locking head further includes a body extending from the backplate having a hole formed therein to enable the apparatus to be secured to an object.

4. The apparatus of claim 1, wherein the locking head further includes a protrusion extending from the backplate that enables the apparatus to be secured to an object.

5. The apparatus of claim 4, wherein the protrusion is a screw.

6. The apparatus of claim 4, wherein the protrusion includes flanges.

7. The apparatus of claim 1, wherein the locking head further includes a label extending therefrom to identify the one or more items secured therein.

8. The apparatus of claim 1, wherein the locking head further includes a handle extending therefrom to carry the one or more items secured therein.

9. The apparatus of claim 1, wherein the strap includes a passthrough to enable the strap to pass therethrough to secure the apparatus to an item that it will be utilized with.

10. The apparatus of claim 9, wherein the passthrough includes one or more passthrough teeth to engage the strap teeth and lock the strap to the item.

11. The apparatus of claim 10, wherein the passthrough further includes an arrangement to enable a tool to disengage the one or more passthrough teeth and enable the strap to be removed from the item.

12. The apparatus of claim 1, wherein the strap includes a friction surface on a side opposite the strap teeth.

13. The apparatus of claim 12, wherein the friction surface is formed therein when the apparatus is made.

14. The apparatus of claim 12, wherein the friction surface is formed separately and secured to the strap.

15. The apparatus of claim 1, wherein the backplate includes a friction surface on a side opposite a side facing the release tab.

16. A method of providing a releasable tightening apparatus around one or more items, the method comprising:

providing an elongate planar strap having a plurality of strap teeth formed on one side and a locking head formed on one end;

securing the strap around the one or more items to be secured by inserting an opposite end of the strap into an opening in the locking head in a locking direction and forming a loop to receive the one or more items, wherein the plurality of strap teeth are positioned external to the loop and away from the one or more items, and wherein amount of the strap that traverses the opening controls size of the loop; and locking the strap in the locking head by engaging at least one lock tooth formed extending into the opening in the locking head with a complementary at least one of the strap teeth to prevent movement of the strap in a release direction; and releasing the strap from around the one or more items when the one or more items are to be released by depressing with a first finger a release pad pivotally connected to the at least one lock tooth while placing a second finger on a backplate that is positioned below the release pad to provide resistance while the release pad is being depressed to disengage the least one lock tooth from the at least one strap tooth; and securing the releasable latch between the first and the second finger and pulling the releasable latch in a direction away from the loop.

17. The method of claim 16, further comprising looping back an end of the strap that traversed the locking head and securing it within an open interior of the backplate.

18. The method of claim 16, further comprising mounting the releasable tightening apparatus to an object with a mounting device extending from the locking head.

19. The method of claim 16, further comprising securing the releasable tightening apparatus to an item by looping the strap through a passthrough formed in the strap to enable the apparatus to be located with the item before it is used to secure the one or more items.

20. The method of claim 19, further comprising releasing the releasable tightening apparatus from the item by using a tool to disengage passthrough teeth from strap teeth.

* * * * *